US010970366B2

United States Patent
Deschamps et al.

(10) Patent No.: US 10,970,366 B2
(45) Date of Patent: Apr. 6, 2021

(54) METHOD FOR SECURING A MULTIMEDIA CONTENT RECORD IN A STORAGE MEDIUM

(71) Applicant: SAGEMCOM BROADBAND SAS, Rueil Malmaison (FR)

(72) Inventors: Lionel Deschamps, Rueil Malmaison (FR); Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 182 days.

(21) Appl. No.: 16/061,216

(22) PCT Filed: Dec. 12, 2016

(86) PCT No.: PCT/EP2016/080627
§ 371 (c)(1),
(2) Date: Jun. 11, 2018

(87) PCT Pub. No.: WO2017/102644
PCT Pub. Date: Jun. 22, 2017

(65) Prior Publication Data
US 2018/0365392 A1 Dec. 20, 2018

(30) Foreign Application Priority Data
Dec. 14, 2015 (FR) ...................................... 1562298

(51) Int. Cl.
*H04L 29/06* (2006.01)
*G06F 21/10* (2013.01)
*H04L 9/08* (2006.01)

(52) U.S. Cl.
CPC ............ *G06F 21/10* (2013.01); *H04L 9/0822* (2013.01); *H04L 9/0897* (2013.01); *G06F 2221/0724* (2013.01); *H04L 2209/60* (2013.01)

(58) Field of Classification Search
CPC .............................. G06F 21/10; H04L 2209/60
See application file for complete search history.

(56) References Cited

U.S. PATENT DOCUMENTS 6,085,323 A * 7/2000 Shimizu ................ H04L 9/0822
380/277
2002/0026582 A1* 2/2002 Futamura .............. H04L 9/3268
713/170

(Continued)

OTHER PUBLICATIONS

International Search Report as issued in International Patent Application No. PCT/EP2016/080627, dated Mar. 27, 2017.

*Primary Examiner* — Jason K Gee
(74) *Attorney, Agent, or Firm* — Pillsbury Winthrop Shaw Pittman LLP

(57) ABSTRACT

A method for securing a recording of multimedia content in a storage medium of a first electronic device, the method including an encryption operation which consists of: for each item of multimedia content to be encrypted, generating a random key within the first electronic device; encrypting the multimedia content by the random key in order to obtain encrypted multimedia content; encrypting, by a user key, the random key so as to obtain a first encrypted random key; encrypting the first encrypted random key by a root key specific to the first electronic device in order to obtain a second encrypted random key; and storing the second encrypted random key and the encrypted multimedia content in the storage medium.

6 Claims, 2 Drawing Sheets

(56) References Cited

U.S. PATENT DOCUMENTS

| | | |
|---|---|---|
| 2003/0070082 A1 | 4/2003 | Nimura et al. |
| 2010/0296655 A1 | 11/2010 | Solow et al. |
| 2013/0007464 A1* | 1/2013 | Madden ................ H04L 63/061 |
| | | 713/179 |
| 2014/0059356 A1* | 2/2014 | Nesnow .............. G06F 21/6272 |
| | | 713/189 |
| 2016/0321460 A1* | 11/2016 | Suter ..................... G06F 21/602 |

* cited by examiner

METHOD FOR SECURING A MULTIMEDIA CONTENT RECORD IN A STORAGE MEDIUM

CROSS-REFERENCE TO RELATED APPLICATIONS

This application is the U.S. National Stage of PCT/EP2016/080627, filed Dec. 12, 2016, which in turn claims priority to French patent application number 1562298 filed Dec. 14, 2015. The content of these applications are incorporated herein by reference in their entireties.

TECHNICAL FIELD OF THE INVENTION

The purpose of the present invention is a method for securing a multimedia content record in a storage medium of an electronic device. The electronic devices concerned by the invention are, in particular, of the digital television decoder type, having recording means, such as one or more hard disks. The storage medium used can consist of this or these hard disks of the digital decoder, but can also be storage media which can be removed from the electronic device.

The term "multimedia content" refers to all digital elements with data of the audio and/or video type, in particular a stream of television signals received live or alternatively pre-recorded, digital photographs, private video content—for example content which has previously been recorded on a particular medium—soundtracks, etc.

The field of the invention is, in general, that of securing access to multimedia content recorded on an electronic device of the digital television decoder type.

TECHNOLOGICAL BACKGROUND OF THE INVENTION

A known principle to provide such protection is the use, within a digital television decoder, of a single root key, combined in a specific manner with a chipset of the decoder in question. Such a key will be referred to as a root key of the digital television decoder. The root key is not accessible through the decoders main processor.

FIG. 1 illustrates the use of a root key to encrypt data.

This figure represents a secure component 101 which, in a digital television decoder 100 within which it is installed, is a hardware component dedicated to security. Secure component 101 is the only component of the decoder able to read a root key 102, which for its part cannot be read or accessed from outside secure component 101. Root key 102 is therefore protected by extremely high degree of protection.

When decoder 100 encrypts (or respectively decrypts) a record, it transfers data 103 for encryption (respectively for decryption) to secure component 101. This component then performs an operation to encrypt 104 (respectively to decrypt) data 103 by means of root key 102, and sends the result of encryption (respectively of decryption) in the form of encrypted (respectively decrypted) data 105 outside secure component 101. Access to the record of data 103, when this data has been encrypted, is thus made impossible from outside decoder 100 incorporating secure component 101.

This solution provides a high level of security, since it is impossible to decrypt data protected by the method which has just been described without knowing root key 102, to which only secure component 101 has access. To recover encrypted data, for example by an after-sales service, it is then necessary to communicate the root key of each digital television decoder for which it is desired to recover encrypted content.

A problem is then posed: the personnel of the after-sales service, or any trusted person or entity with the root key, can access the unencrypted data, particularly when they perform a standard exchange.

Furthermore, the described solution does not enable an encrypted record to be reread on another electronic device, in particular on another digital television decoder, even if the latter also belongs to the owner of the electronic device on which the data has been encrypted.

Various solutions have been proposed in the state of the art to improve encryption security of a multimedia content, and/or to make access to the encrypted content more flexible for authorised persons, and in particular for the owners of a first electronic device, by means of which the multimedia content has been encrypted.

It has, for example, been proposed to perform the encryption operations with a key which is specific to the multimedia content which is to be encrypted. But there is then no access to the encrypted content using another decoder of television. It has also been proposed to use a common group root key, which would be shared by several digital television decoders. But the encrypted data is then less protected, since one then merely has to break (i.e. to discover how to access the unencrypted content) a single one of the digital television decoders to access the encrypted content of all the other decoders in the same group.

But no solution of the state of the art enables the following requirements to be met simultaneously:

Optimum flexibility, giving a user the possibility of accessing encrypted multimedia content from a plurality of electronic devices.

Optimum security, with the assurance that the encrypted multimedia content will not be accessible, and in particular will not be read, on an unauthorised device.

An optimal guarantee of privacy, with the possibility of authorising a third party (for example an after-sales service) to duplicate a record of an encrypted multimedia content in order to transfer it from a first digital television decoder to a second digital television decoder, whilst at the same time preventing this third party from reading the record in its unencrypted form.

Advantageously, simplicity of the security method used, restricting the scale of the calculations which must be made, and therefore restricting the volume of data which must be encrypted and/or decrypted.

GENERAL DESCRIPTION OF THE INVENTION

The method according to the invention proposes a solution to the described problems and disadvantages. In the invention a solution is proposed to give the multimedia content encrypted using a first electronic device flexibility, by authorising other devices to access this multimedia content, whilst guaranteeing, firstly, optimum security of the contents, where unauthorised devices cannot access this content, and optimum protection of private life mentioned above. Advantageously, in the invention, the method is used in a manner which is particularly simple and inexpensive in terms of computation capacity.

To this end, in the invention a method for securing a record of a multimedia content in a storage medium of a first electronic device is essentially proposed in which the said method comprises an encryption operation consisting in:

for each multimedia content requiring encryption, generating a random key within the first electronic device;

encrypting the multimedia content using the random key, to obtain encrypted multimedia content;

encrypting the random key, using a user key, to obtain a first encrypted random key;

encrypting the first encrypted random key using a root key specific to the first electronic device, to obtain a second encrypted random key;

recording the second encrypted random key and the encrypted multimedia content in the storage medium.

The method according to the invention may comprise, in addition to the main steps mentioned in the previous paragraph, one or more of the following additional characteristics:

the method comprises a decryption operation consisting in:
  decrypting the second encrypted random key using the root key specific to the first electronic device to obtain the first encrypted random key;
  decrypting the first random key using the user key to obtain the random key;
  decrypting the encrypted multimedia content using the random key to obtain the unencrypted multimedia content.

the method comprises an operation to access the multimedia content using a second electronic device consisting in:
  decrypting, within the first electronic device, the second encrypted random key using the root key specific to the first electronic device to obtain the first encrypted random key;
  establishing a secure connection between the first electronic device and the second electronic device;
  transmitting, from the first electronic device to the second electronic device, the first encrypted random key over the secure connection;
  transmitting, from the first electronic device to the second electronic device, the encrypted multimedia content;
  decrypting, within the second electronic device, the first random key using the user key to obtain the random key;
  decrypting, within the second electronic device, the encrypted multimedia content using the random key (RK) to obtain the unencrypted multimedia content.

the encrypted multimedia content is transmitted from the first electronic device to the second electronic device over the secure connection.

the secure connection is established using the SSL/TLS protocol.

the method comprises an operation to transfer the encrypted multimedia content to a third electronic device consisting in:
  decrypting, within the first electronic device, the second encrypted random key using the root key specific to the first electronic device to obtain the first encrypted random key;
  transmitting, from the first electronic device to the third electronic device, the first encrypted random key and the encrypted multimedia content;
  within the third electronic device, encrypting the first random key using a root key specific to the third electronic device, to obtain a modified second encrypted random key;
  recording the modified second encrypted random key and the encrypted multimedia content in a storage means of the third electronic device.

the root key specific to the first electronic device is obtained using an initial root key of the first electronic device, where, to generate the root key, the said initial root key is subjected to a cascade of encoding operations, and where each encoding operation is performed using a specific intermediate key.

the root key is protected in a secure component of the first electronic device.

the multimedia content is obtained in a stream of television signals received live by the first electronic device, or previously recorded within the first electronic device, or digital photographs, or private video content or soundtracks.

The various additional characteristics of the method according to the invention, provided they are not mutually exclusive, are combined in all possible combinations to give different examples of implementation of the invention.

The present invention also relates to an electronic device of the digital television decoder type characterised by the fact that it is designed to implement the method according to any of the implementations of the invention.

Another aspect of the invention relates to a computer program product comprising instructions which, when the program is executed by a computer, cause this computer to implement the steps of the method according to the invention. In particular, those skilled in the art will recognise that a digital television decoder is an example of a computer. This aspect of the invention therefore relates in particular to a computer program product containing instructions which, when the program is executed by a digital television decoder, cause it to implement the steps of the method according to the invention.

Another aspect of the invention relates to a computer-readable recording medium on which the computer program product according to the invention is recorded. This aspect of the invention relates in particular to a recording medium which is readable by a digital television decoder, on which medium the computer program product according to the invention is recorded.

The invention and its various applications will be better understood on reading the description which follows, and on examining the figures which accompany it.

BRIEF DESCRIPTION OF THE FIGURES

These are shown as an indication only, and are not restrictive of the invention in any way. The figures show.

DESCRIPTION OF THE PREFERRED IMPLEMENTATIONS OF THE INVENTION

Unless otherwise stipulated, the various elements shown in several figures will have the same references.

Figure 2:
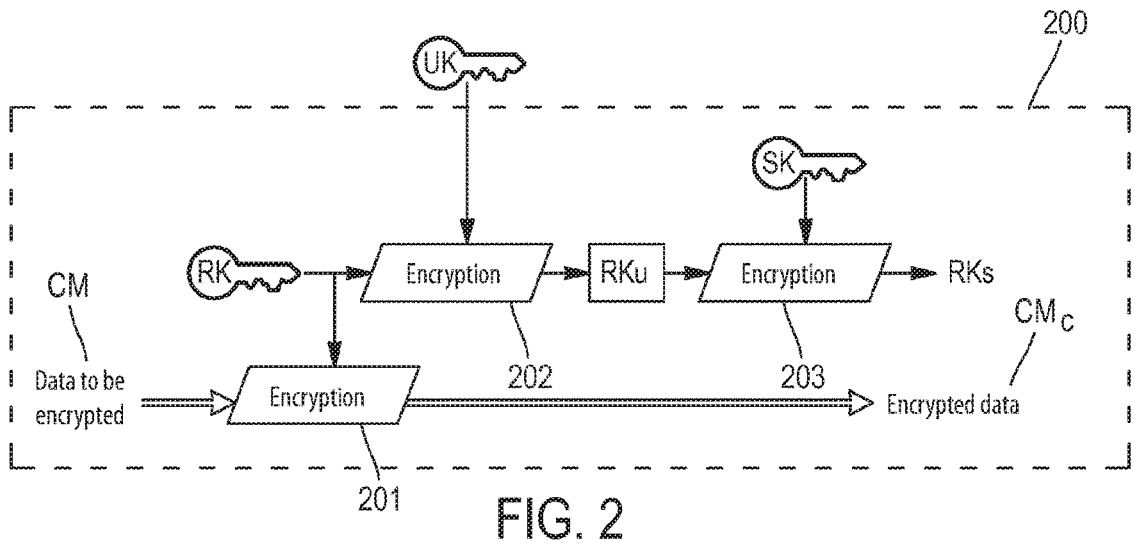
in FIG. 2, a functional diagram illustrating an example of encryption of multimedia content by an example implementation of the method according to the invention.

FIG. 2 represents a functional diagram illustrating an example data encryption, corresponding to multimedia content MC, using the method according to the invention. In this example, within a first electronic device 200, for example of the digital television decoder type, the following operations are performed in succession:

Generation of a random key RK for each multimedia content MC to encrypt;

Encryption 201 of multimedia content MC using random key RK to obtain encrypted multimedia content eMC.

Encryption 202 of random key RK to obtain a first encrypted random key RKu using a user key UK. User key UK takes the form, for example, of a code which a user chooses, or alternatively a fingerprint, or any other customised means which can be used by the said devices implementing the method according to the invention. Only the user in possession of user key RKu will thus be able subsequently to decrypt encrypted multimedia content eMC.

Encryption 203 of first encrypted random key RKu to obtain a second encrypted random key RKs using root key SK of first electronic device 200. Only an authorised electronic device, i.e. one in possession of root key SK, will thus be able to decrypt encrypted multimedia content eMC.

Recording of second encrypted random key RKs with encrypted multimedia content eMC.

Figure 1:
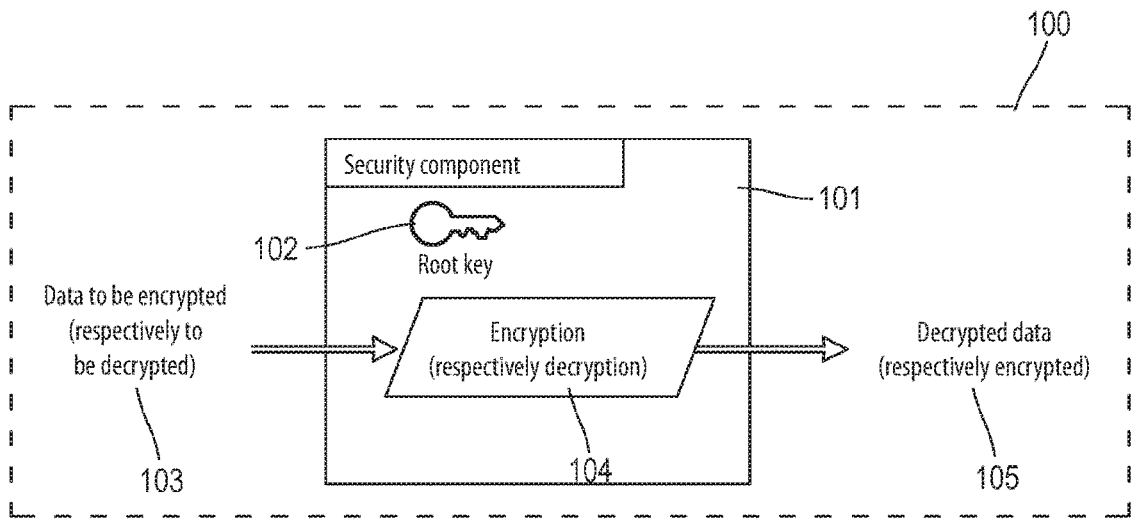
in FIG. 1, previously described, a diagrammatic representation of the use of a root key to encrypt data within a digital television decoder.

Advantageously, to increase the level of security, the various encryption operations which have just been described are performed by a security component of the same type as the one shown in FIG. 1. In general, the encryption algorithms used can be any type of symmetrical algorithm (for example of the DES, 3DES, AES, etc. type).

Use of two successive keys, one specific to the user and the other specific to the electronic device, enables higher levels of security and confidentiality to be obtained. Indeed:

the user will not be able to decrypt the encrypted multimedia content eMC on an unauthorised device since it does not have the root key;

the after-sales service, or the trusted third party, which is in possession of root key SK, will not be able to decrypt encrypted multimedia content eMC either, since it does not have user key UK.

Figure 3:
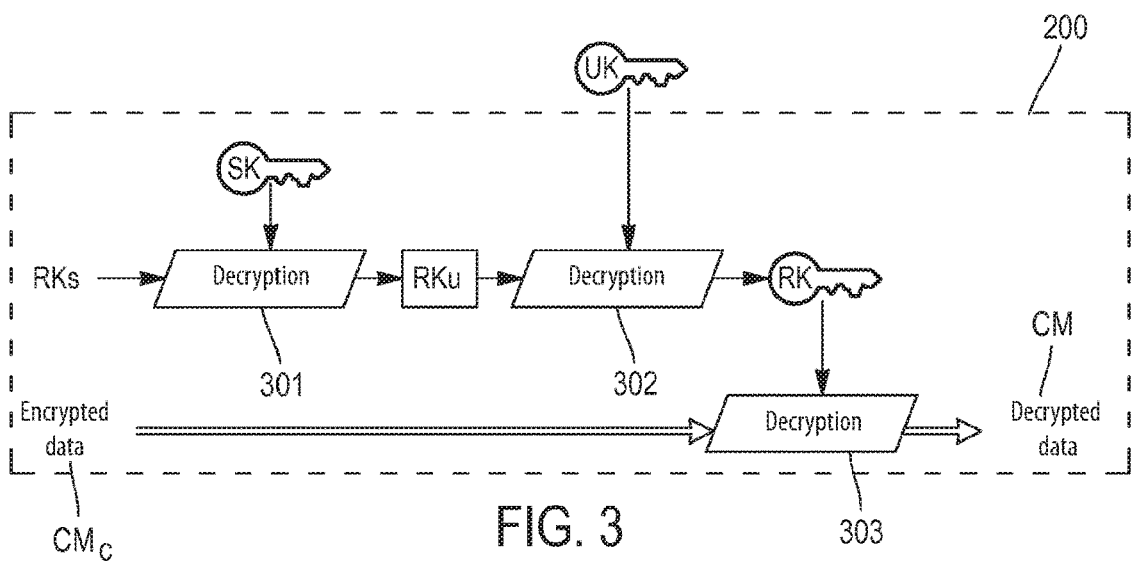
in FIG. 3, a functional diagram illustrating an example of decryption of a multimedia content by an example implementation of the method according to the invention.

FIG. 3 represents a functional diagram illustrating an example decryption, according to an implementation of the method according to the invention, of encrypted multimedia content eMC, obtained using the operations which have just been described. In this example, within first electronic device 200, the following operations are performed in succession:

Recovery of second encrypted random key RKs with encrypted multimedia content eMC.

Decryption 301 of second encrypted random key RKs to obtain first encrypted random key RKu using root key SK of first electronic device 200.

Decryption 302 of first encrypted random key RKu to obtain random key RK using user key UK.

Decryption 303 of encrypted multimedia content eMC using random key RK to obtain unencrypted multimedia content MC.

Figure 4:
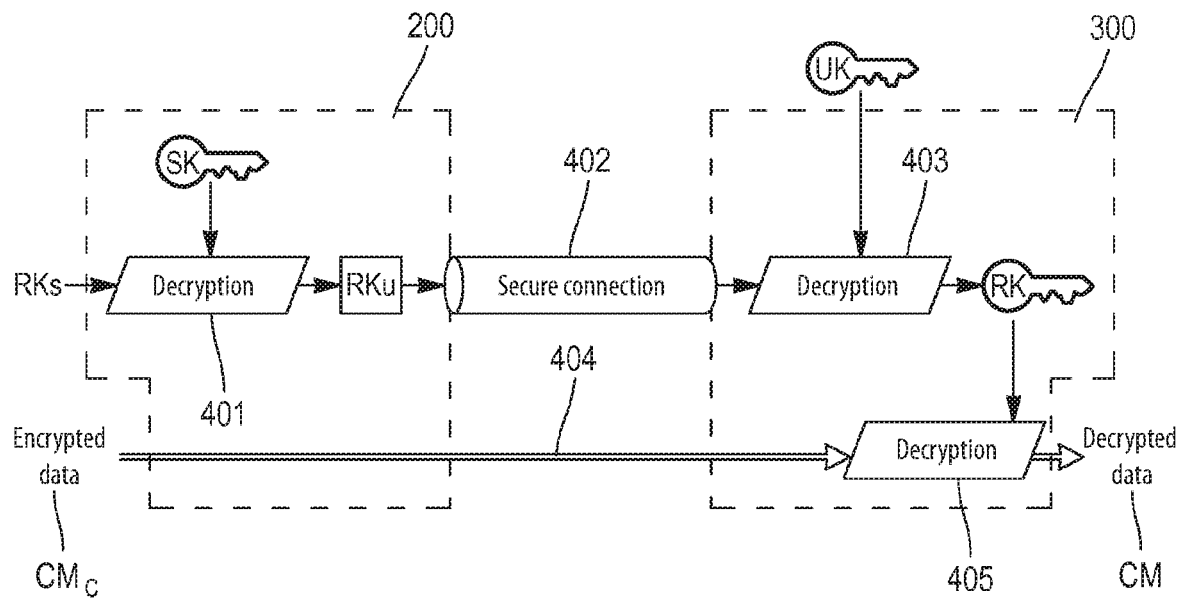
in FIG. 4, a functional diagram illustrating the access, by a second electronic device, to the multimedia content encrypted by a first electronic device, in an example implementation of the method according to the invention.

FIG. 4 represents a functional diagram illustrating an example display, according to an implementation of the method according to the invention, of multimedia content MC encrypted by first electronic device 200, where the display is performed on a second electronic device 300.

In this example the following operations are performed in succession:

Recovery, within first electronic device 200, of second encrypted random key RKs with encrypted multimedia content eMC.

Decryption 401 of second encrypted random key RKs to obtain first encrypted random key RKu using root key SK of first electronic device 200.

Establishment of a secure connection 402 between first electronic device 200 and second electronic device 300, for example using the SSL/TLS protocol.

Transmission of first encrypted random key RKu to second electronic device 300 over secure connection 402.

Transmission of encrypted multimedia content eMC to second electronic device 300 over secure connection 402. In an advantageous variant encrypted multimedia content eMC is transmitted to second electronic device 300 by any other means. As multimedia content eMC is already encrypted it is not necessary to transmit it over secure connection 402; since a secure connection implies additional steps of encryption and decryption, which are expensive in computational terms, substantial computational economies are obtained by this means.

The following steps are performed within second electronic device 300:

Reception of first encrypted random key RKu from first electronic device 200 over secure connection 402.

Decryption 403 of first encrypted random key RKu to obtain random key RK using user key UK.

Reception 404 of encrypted multimedia content eMC from first electronic device 200.

Decryption 405 of the record using random key RK to obtain unencrypted multimedia content MC.

Thus it is not necessary to trans-encrypt the data.

Since the connection between the two electronic devices is secure the user cannot recover encrypted random key RKu, and cannot therefore decrypt the multimedia content on another device.

Figure 5:
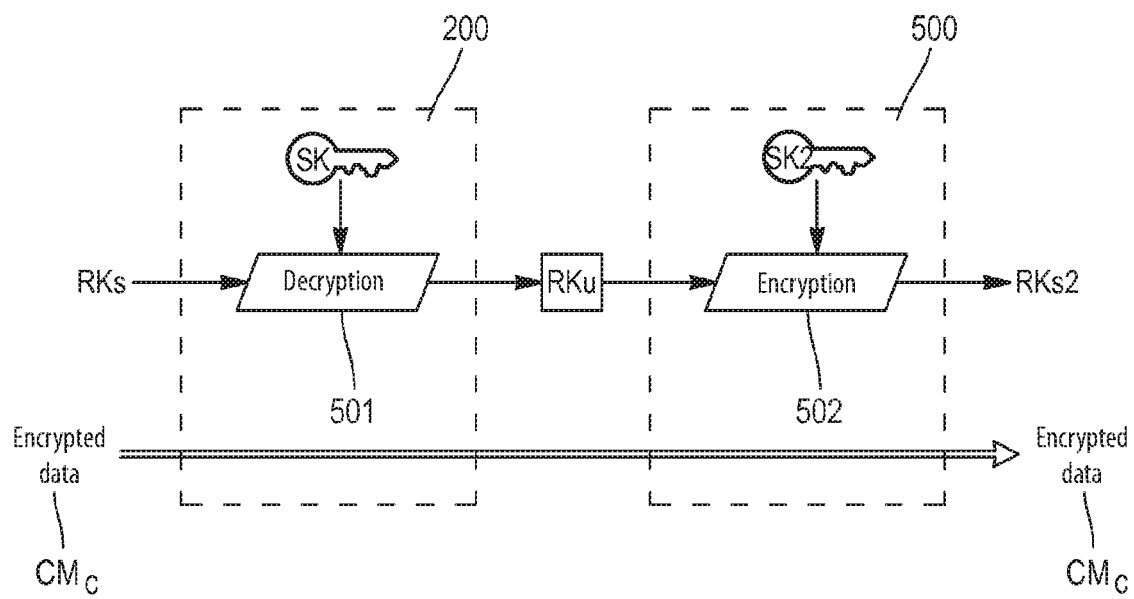
in FIG. 5, a functional diagram illustrating a transfer, from an electronic device to another electronic device, of a multimedia content encrypted within the first electronic device, in an example implementation of the method according to the invention.

FIG. 5 represents a functional diagram illustrating an example transfer, according to an implementation of the method according to the invention, of multimedia content eMC encrypted by first electronic device 200, to a third electronic device 500.

At this juncture the example is considered of an after-sales service which needs to transfer an encrypted multimedia content eMC from first electronic device 200 to a third electronic device 500. The following operations are then performed:

Recovery of second encrypted random key RKs with encrypted multimedia content eMC.

Decryption 501, within first electronic device 200, of second encrypted random key RKs to obtain first encrypted random key RKu using root key SK of first electronic device 200.

Encryption 502, within third electronic device 500, of first encrypted random key RKu to obtain a second, modified encrypted random key RKs2, using a root key SK2 specific to third electronic device 500.

Copying of encrypted multimedia content eMC from first electronic device 200 to third electronic device 500.

It is then possible to record second encrypted random key RKs2, designed for third electronic device 500 with encrypted multimedia content eMC.

Once again, it is not necessary to trans-encrypt the multimedia data.

In general, the after-sales service does not itself have root keys SK and SK2 of first electronic device 200 and of third electronic device 500. These keys are kept by a trusted third party which is a security specialist, and the after-sales service must send the data to be trans-encrypted to the said trusted third party. In the state of the art the data to be trans-encrypted is the multimedia data, which is of high volume. Advantageously, according to the invention, the transmitted data is of very low volume (typically a few bytes), since only a key is transmitted in each direction (RKs and RKs2 respectively). In addition, neither the after-sales service nor the trusted third party can decrypt the encrypted multimedia content, since they are not in possession of user key UK.

The invention claimed is:

1. A method for securing a record of a multimedia content in a storage medium of a first electronic device, the method comprising an encryption operation consisting in:
   for each multimedia content requiring encryption, generating a random key within the first electronic device;
   encrypting the multimedia content using the random key, to obtain encrypted multimedia content;
   encrypting the random key, using a user key, to obtain a first encrypted random key, said user key being received by the first electronic device from a user of the first electronic device;
   encrypting the first encrypted random key using a root key specific to the first electronic device, to obtain a second encrypted random key, said root key being different from the user key;
   recording the second encrypted random key and the encrypted multimedia content in the storage medium, wherein the method comprises an operation to access the multimedia content by a second electronic device, consisting in:
   decrypting, within the first electronic device, the second encrypted random key using the root key specific to the first electronic device to obtain the first encrypted random key;
   establishing a secure connection between the first electronic device and the second electronic device;
   transmitting, from the first electronic device to the second electronic device, the first encrypted random key over the secure connection;
   transmitting, from the first electronic device to the second electronic device, the encrypted multimedia content;
   decrypting, within the second electronic device, the first random key using the user key to obtain the random key, and
   decrypting, within the second electronic device, the encrypted multimedia content using the random key to obtain the unencrypted multimedia content.

2. The method according to claim 1, wherein the encrypted multimedia content is transmitted from the first electronic device to the second electronic device over the secure connection.

3. The method according to claim 1, wherein the secure connection is established using the SSL/TLS protocol.

4. The method according to claim 1, further comprising:
   within the second electronic device, encrypting the first random key using a root key specific to the second electronic device, to obtain a modified second encrypted random key;
   recording the modified second encrypted random key and the encrypted multimedia content in a storage means of the other electronic device.

5. The method according to claim 1, wherein the root key is protected in a secure component of the first electronic device.

6. The method according to claim 1, wherein the multimedia content is obtained in a stream of television signals received live by the first electronic device, or previously recorded within the first electronic device, or digital photographs, or private video content or soundtracks.

* * * * *